United States Patent
Naka et al.

(10) Patent No.: US 6,602,815 B1
(45) Date of Patent: Aug. 5, 2003

(54) EXHAUST SYSTEM COMPRISING A HEAT-RESISTANT HC ADSORBENT

(75) Inventors: Takahiro Naka, Wako (JP); Tetsuo Endo, Wako (JP); Haruhiko Shimizu, Wako (JP); Yoshikazu Fujisawa, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/147,526

(22) PCT Filed: Mar. 17, 1998

(86) PCT No.: PCT/JP98/01124
§ 371 (c)(1),
(2), (4) Date: Jan. 14, 1999

(87) PCT Pub. No.: WO98/55223
PCT Pub. Date: Dec. 10, 1998

(30) Foreign Application Priority Data

Jun. 3, 1997 (JP) .............................. 9-145539

(51) Int. Cl.⁷ ......................... B01J 29/04; B01J 21/00; B01J 29/00
(52) U.S. Cl. ........................................ 502/61; 502/73
(58) Field of Search ............................ 502/60, 61, 73, 502/77, 407, 411, 414; 95/902; 423/DIG. 22, 713, 714, 715; 585/702, 739

(56) References Cited

U.S. PATENT DOCUMENTS

| 4,346,021 | A | * | 8/1982 | Ball et al. ............... 252/431 N |
| 4,748,013 | A | * | 5/1988 | Saito et al. ................ 423/241 |
| 4,988,653 | A | * | 1/1991 | Herbst et al. ................ 502/67 |
| 4,994,254 | A | * | 2/1991 | Suzuki et al. ............... 423/328 |
| 5,010,048 | A | * | 4/1991 | Petit et al. ................... 502/61 |
| 5,159,128 | A | * | 10/1992 | Forschner et al. .......... 585/653 |
| 5,174,977 | A | * | 12/1992 | Chang et al. ............... 423/706 |
| 5,174,978 | A | * | 12/1992 | Hellring et al. ............. 423/708 |
| 5,174,981 | A | * | 12/1992 | Hellring et al. ............. 423/705 |
| 5,209,918 | A | * | 5/1993 | Hellring et al. ............. 423/706 |
| 5,238,890 | A | * | 8/1993 | Hayasaka et al. ............. 502/61 |
| 5,256,614 | A | * | 10/1993 | Itoh et al. ..................... 502/61 |
| 5,262,144 | A | * | 11/1993 | McCulloch ............... 423/328.2 |
| 5,278,114 | A | * | 1/1994 | Wielers et al. ................ 502/67 |
| 5,281,566 | A | * | 1/1994 | Marcilly et al. .............. 502/61 |
| 5,306,684 | A | * | 4/1994 | Itoh et al. ..................... 502/61 |
| 5,312,608 | A | * | 5/1994 | Hayasaka et al. ........ 423/213.5 |
| 5,336,393 | A | * | 8/1994 | Takatsu et al. .............. 208/120 |
| 5,354,719 | A | * | 10/1994 | Gabelica et al. .............. 502/62 |
| 5,422,333 | A | * | 6/1995 | Kano et al. ................... 502/60 |
| 5,456,822 | A | * | 10/1995 | Marcilly et al. ............. 208/136 |
| 5,681,788 | A | * | 10/1997 | Kanesaka et al. ............. 502/65 |
| 5,811,067 | A | * | 9/1998 | Lecuyer et al. .......... 423/239.2 |
| 5,888,926 | A | * | 3/1999 | Biswas et al. ............... 502/406 |
| 5,952,258 | A | * | 9/1999 | Saitoh et al. ................. 502/61 |
| 5,966,929 | A | * | 10/1999 | Socha, Jr. .................... 60/274 |
| 6,042,807 | A | * | 3/2000 | Faraj .......................... 423/704 |

FOREIGN PATENT DOCUMENTS

| EP | 0 342 075 | 11/1989 |
| FR | 2 683 742 | 5/1993 |
| GB | 1 555 928 | 11/1979 |
| JP | 53-76199 | 7/1978 |
| JP | 64-34440 | 2/1989 |
| JP | 2-18318 | 1/1990 |
| JP | 2-71842 | 3/1990 |
| JP | 6-312132 | 11/1994 |
| JP | 7-166852 | 6/1995 |

* cited by examiner

Primary Examiner—Stanley S. Silverman
Assistant Examiner—Cam N. Nguyen
(74) Attorney, Agent, or Firm—Arent Fox Kintner Plotkin & Kahn, PLLC

(57) ABSTRACT

An exhaust system comprising a heat-resistant HC adsorbent comprising an MFI metallo-silicate including at least one of gallium (Ga) and indium (In) as a skeleton forming element, and a metal component ME including at least one of an alkali metal and an alkali earth metal in a content of ME≦0.05% by weight. Such an HC adsorbent has an excellent heat resistance.

8 Claims, 4 Drawing Sheets

EXHAUST SYSTEM COMPRISING A HEAT-RESISTANT HC ADSORBENT

FIELD OF THE INVENTION

The present invention relates to a heat-resistant HC (hydrocarbon) adsorbent for use in an exhaust system in an automobile or the like.

BACKGROUND ART

There are known exhaust emission control catalysts having various configurations which are disposed in an exhaust system in an automobile. However, a usual exhaust emission control catalyst exhibits a purifying ability by oxidation in a high temperature range of an exhaust gas, e.g., about 180° C. or more, and hence, such usual exhaust emission control catalyst exhibits only an extremely low purifying ability with respect to an exhaust gas having a low temperature immediately after starting of an engine and containing HC at a high concentration.

Therefore, to catch HC in the low-temperature exhaust gas, it is contemplated that an HC adsorbent is disposed in the exhaust system downstream of the catalyst. In this case, zeolite is used as the HC adsorbent.

The temperature of the exhaust gas flowing in the exhaust system is generally on the order of 1,000° C., and for this reason, a heat resistance accommodating such temperature is required for the HC adsorbent.

There has been proposed a zeolite having a high silica/alumina ratio and containing a reduced amount of aluminum which becomes a starting point of thermal deterioration, in order to enhance the heat resistance. However, even the zeolite suffers from a problem that the heat resistance thereof is not improved sufficiently, and the HC adsorbing and desorbing ability is also low.

An alkali metal or an alkali earth metal is liable to be contained as an impurity in the zeolite. These metal components cause an alkali melting phenomenon at a high temperature to cut off the Si—O bond in the zeolite to reduce the heat resistance of the zeolite.

DISCLOSURE OF THE INVENTION

Accordingly, it is an object of the present invention to provide an HC adsorbent of the above-described type, which has a sufficiently improved heat-resistance and a good HC adsorbing/desorbing ability.

To achieve the above object, according to the present invention, there is provided a heat-resistant HC adsorbent comprising an MFI metallo-silicate including at least one of gallium (Ga) and indium (In) as a skeleton forming element, and having a metal component ME comprising at least one of an alkali metal and an alkali earth metal in a content of $ME \leq 0.05\%$ by weight.

The MFI metallo-silicate has a three-dimensional skeletal structure, representatively as does an MFI aluminosilicate, e.g., a ZSM-5 zeolite. The Ga site and In site in such structure correspond to the Al site of the ZSM-5 zeolite. Moreover, gallium (Ga) and indium (In) have a high bonding force in the three-dimensional skeletal structure and exhibit a characteristic that they are difficult to be released from the structure.

The HC adsorbent comprising the MFI metallo-silicate having such a three-dimensional skeletal structure and having the content of the metal component ME set in the above-described range has a high heat-resistance and a good HC adsorbing/desorbing ability.

However, if the ME content is higher than 0.05% by weight, the heat resistance is lowered. In the MFI metallo-silicate, it is desirable from the viewpoint of enhancement in heat resistance that the ME content is zero. However, it is difficult to suppress the ME content to zero, because ME is included as an impurity in a starting material in the synthesis of the MFI metallo-silicate. Therefore, it can be said that the lower limit for the ME content is a value extremely near zero.

The alkali metal corresponds to sodium (Na), lithium (Li) and potassium (K), and the alkali earth metal corresponds to beryllium (Be), magnesium (Mg) and calcium (Ca).

BEST MODE FOR CARRYING OUT THE PRESENT INVENTION

Figure 1:
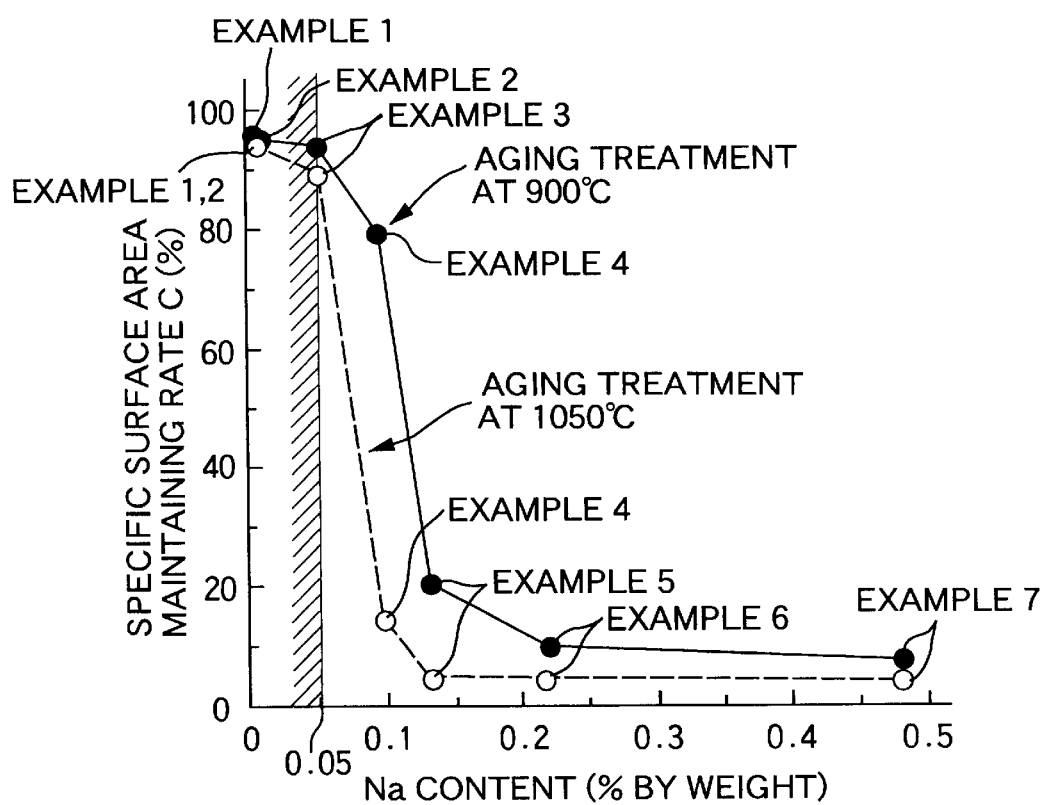
FIG. 1 is a graph showing the relationship between an Na content and a specific surface area maintaining rate C.

I-1. Synthesis of MFI Gallium Silicate (1) A first starting material was prepared in an amount of 11.9 kg by adding 0.4 kg of TPA-Br (tetrapropyl ammonium bromide, a template agent) and 5 kg of pure water to 6.5 kg of a colloidal silica available on the market (containing 30% by weight of $SiO_2$ and 0.4% by weight of $Na_2O$).

(2) A second starting material was prepared in an amount of 8.38 kg by adding 0.3 kg of sodium hydroxide and 8 kg of pure water to 0.08 kg of gallium chloride ($GaCl_3$ with a purity of 99.999%).

(3) The first starting material was placed into a stainless vessel, and the second starting material was gradually added to the first starting material, while agitating the first starting material.

(4) A mixture of the first and second starting materials was agitated for 30 minutes to provide an entirely uniform alkali gel of gallium silicate. The composition of the alkali gel was as follows: The mole ratio of $SiO_2/Ga_2O_3=750$; the mole ratio of $Na_2O/SiO_2=0.133$; the mole ratio of $H_2O/Na_2O=226$; and the mole ratio of $TPA-Br/SiO_2=0.05$.

(5) The alkali gel was thrown into an autoclave where it was maintained at 170° C. for 24 hours with agitation for crystallization, thereby providing a crystal slurry.

(6) The crystal slurry was subjected to a solid-liquid separation treatment to provide a solid component and then, the solid component was washed and then filtered to provide a cake.

(7) The cake was dried at 110° C. for 24 hours and then calcined at 550° C. for 12 hours using an electric oven. Thereafter, the calcined product was pulverized to provide about 1.3 kg of a (powdery MFI gallium silicate.

The content of gallium (Ga) in the MFI gallium silicate was equal to 0.4% by weight; the content of sodium (Na) as an alkali metal was equal to 0.48% by weight, and the content of aluminum (Al) was equal to 0.04% by weight.

This aluminum is considered as being incorporated in the colloidal silica available on the market.

I-2. Removal of Sodium (Na)

One hundred grams of the MFI gallium silicate was mixed to one liter of 5N hydrochloric acid and then, the mixture was maintained at 90° C. by use of a reflux condenser or the like with agitation for 20 hours and then subjected to the following steps: the filtration, the washing of solids with water and the drying at 300° C., thereby providing an MFI gallium silicate with the Na content regulated to 0.005% by weight. This is called example 1.

A predetermined amount of sodium (Na) was added to example 1 to prepare examples 2, 3, 4, 5 and 6 of MFI gallium silicates. An MFI gallium silicate synthesized in the above manner was selected as example 7. The contents of sodium (Na) in examples 1 to 7 are as follows:

TABLE 1

| MFI gallium silicate | Content of Na (% by weight) |
| --- | --- |
| Example 1 | 0.005 |
| Example 2 | 0.01 |
| Example 3 | 0.05 |
| Example 4 | 0.095 |
| Example 5 | 0.13 |
| Example 6 | 0.22 |
| Example 7 | 0.48 |

I-3. Estimation of Heat Resistance

As for examples 1 to 7 of the MFI gallium silicates, the specific surface area A was measured by a BET one-point process. Then, examples 1 to 7 were subjected to an aging treatment at 900° C. for 100 hours in an air atmosphere by use of an electric oven. Thereafter, as for examples 1 to 7, the specific surface area $B_1$ was measured in the same manner as described above. A specific surface area maintaining rate C (%) was calculated according to an equation:

$$C=[1-\{(A-B_1)/A\}]\times 100$$

from the specific surface areas A and $B_1$ in order to take the heat resistance to the aging treatment into consideration.

Examples 1 to 7 in new states were subjected to the aging treatment at 1050° C. for 20 hours in an air atmosphere by use of an electric oven. Then, as for examples 1 to 7, a specific surface area $B_2$ was measured in the same manner as described above. A specific surface area maintaining rate C (%) was calculated according to the above equation from the specific surface areas A and $B_2$.

FIG. 1 shows the relationship between the Na content and the specific surface area maintaining rate C for examples 1 to 7. As apparent from FIG. 1, if the Na content is equal to or smaller than 0.05% by weight as in examples 1 to 3, the specific surface area maintaining rate C is as extremely high as equal to or larger than 90% by weight. From this, it can be seen that each of examples 1 to 3 has an excellent heat resistance.

In the MFI gallium silicate, the Ga content is suitable to be in a range of 0.01% by weight $\leq$ Ga $\leq$ 0.5% by weight. If the Ga content is smaller than 0.01% by weight, the crystallizability is deteriorated. On the other hand, if Ga>0.5% by weight, the selectively HC adsorbing ability is lowered, because the mole ratio of $SiO_2/Ga_2O_3$ is decreased.

II-1. Synthesis of MFI Indium Silicate

About 1.3 kg of a powdery MFI indium silicate was produced in the same manner as in the item I-1, except that indium chloride ($InCl_3$ with a purity of 99.999%) was used in place of the gallium chloride used in the item I-1. In this case, the composition of the alkali gel of the indium silicate was as follows: The mole ratio of $SiO_2/InO_3$=750; the mole ratio of $Na_2O/SiO_2$=0.133; the mole ratio of $H_2O/Na_2O$=226; and the mole ratio of TPA-Br/$SiO_2$=0.05.

The content of indium (In) in the MFI indium silicate was equal to 0.6% by weight, and the content of aluminum (Al) was equal to 0.04% by weight. The content of sodium (Na) in the MFI indium silicate was regulated to 0.01% by weight.

II-2. Synthesis of MFI Aluminosilicate

About 1.3 kg of a powdery MFI aluminosilicate (ZSM-5 zeolite) was produced in the same manner as in the item I-1, except that sodium aluminate (containing 52.7% by weight of $Al_2O_3$ and 41.9% by weight of $Na_2O$) was used in place of the gallium chloride used in the item I-1.

In this case, the composition of the alkali gel of the aluminosilicate was as follows: The mole ratio of $SiO_2/Al_2O_3$=750; the mole ratio of $Na_2O/SiO_2$=0.133; the mole ratio of $H_2O/Na_2O$=226; and the mole ratio of TPA-Br/$SiO_2$=0.05.

The content of aluminum (Al) in the MFI aluminosilicate was equal to 0.18% by weight and further, the content of sodium (Na) was regulated to 0.01% by weight.

II-3. Estimation of Heat Resistance

Example 2 in Table 1, namely, the MFI gallium silicate having the Na content of 0.01% by weight, was selected.

As for the MFI indium silicate, the MFI gallium silicate and the MFI aluminosilicate, the specific surface areas in the new states and after subjected to the aging treatment were measured in the same manner as in the item I-3, and the specific surface area maintaining rate C was calculated from the specific surface areas. The aging treatment was carried out by maintaining the MFI indium silicate and the like at a predetermined temperature for 100 hours in an air atmosphere by use of an electric oven in the above manner.

Figure 2:
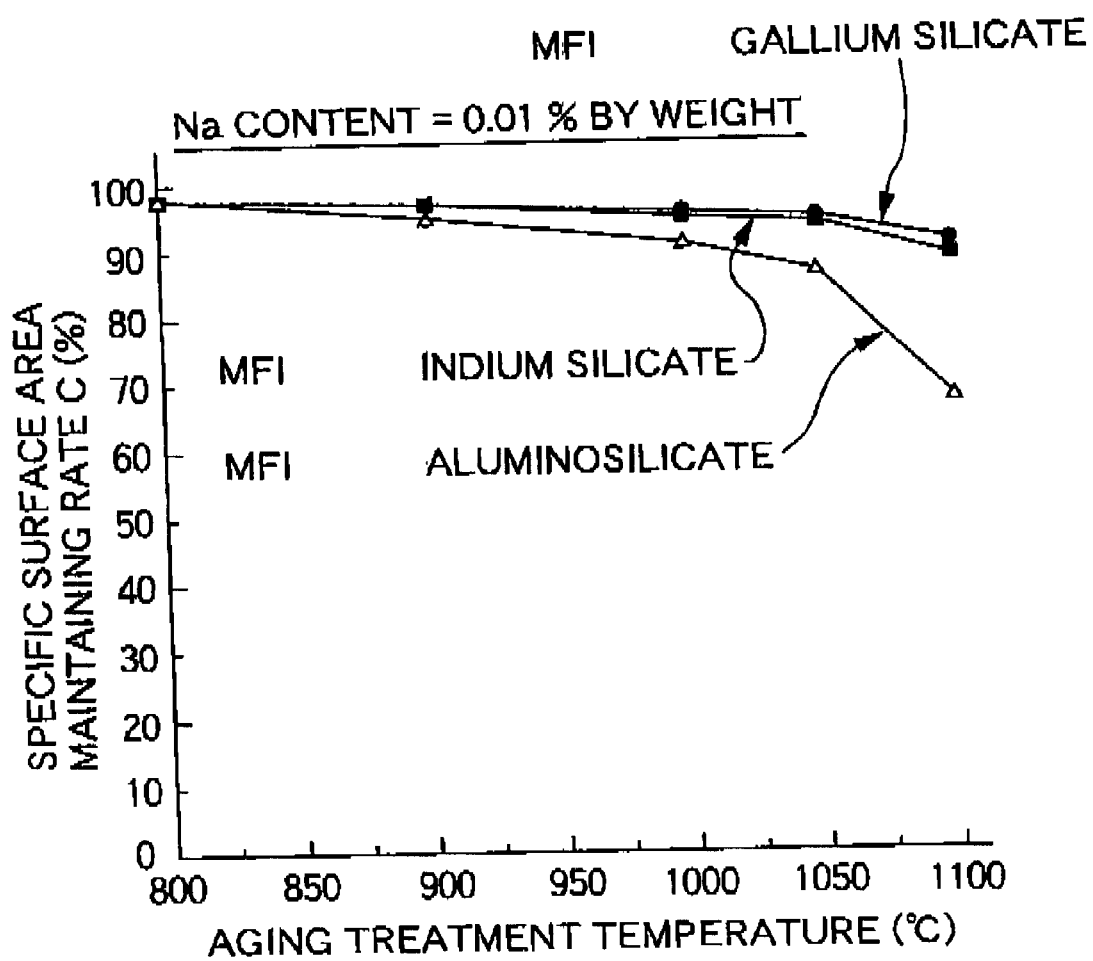
FIG. 2 is a graph showing the relationship between an aging treatment temperature and the specific surface area maintaining rate C.

FIG. 2 shows the relationship between the aging treatment temperature and the specific surface area maintaining rate C for the MFI indium silicate and the like. As apparent from FIG. 2, the specific surface area maintaining rate C of each of the MFI gallium silicate and the MFI indium silicate is as extremely high as about 95% even when the aging treatment temperature is set at 1050° C., but the specific surface area maintaining rate C of the MFI aluminosilicate is equal to about 86%. From this, it can be seen that each of the MFI gallium silicate and the MFI indium silicate has an excellent heat resistance, as compared with the MFI aluminosilicate.

These three silicates have the same Na content and hence, the heat-resistance enhancing effect in this case depends on gallium (Ga) and indium (In).

In the MFI indium silicate, the In content is suitable to be in a range of 0.01% by weight $\leq$ In $\leq$ 0.6% by weight. If the In content is smaller than 0.01% by weight, the crystallizability is lower, resulting in an unstable structure. On the other hand, if In>0.6% by weight, the selectively HC adsorbing ability is lowered, because the mole ratio of $SiO_2/In_2O_3$ is decreased.

III. HC Adsorption and Desorption Test

Supposing an exhaust gas, a test gas having a composition shown in Table 2 was prepared.

TABLE 2

| Test gas | |
| --- | --- |
| Constituent | Concentration (% by volume) |
| $O_2$ | 0.5 |
| $CO_2$ | 14 |

TABLE 2-continued

| | Test gas |
|---|---|
| Constituent | Concentration (% by volume) |
| CO | 0.5 |
| $C_5H_{10}$ | 0.024 |
| $H_2$ | 0.17 |
| NO | 0.05 |
| $H_2O$ | 10 |
| $N_2$ | Balance |

A purifying test was carried out in the following manner: First, 100 g of the MFI gallium silicate in a new state was placed into a stationary-bed flowing reaction device. Then, a test gas was supplied to flow within the device at a space velocity of 50,000 $hr^{-1}$, and the temperature of the test gas was risen from normal temperature to 200° C. at rising speed of 20° C./min. The adsorption rate of $C_5H_{10}$ (pentene) and the desorption rate of $C_5H_{10}$ were measured at a predetermined gas temperature. Even when the MFI aluminosilicate in a new state was used, a similar measurement was carried out.

Further, the MFI gallium silicate and the MFI aluminosilicate were subjected to an aging treatment at 900° C. for 20 hours in a reflux gas (comprising 1% by volume of $O_2$, 10% by volume of $H_2O$ and the balance of $N_2$). Then, a measurement similar to the above-described measurement was carried out for the MFI gallium silicate and the MFI aluminosilicate treated as described above.

Figure 3:
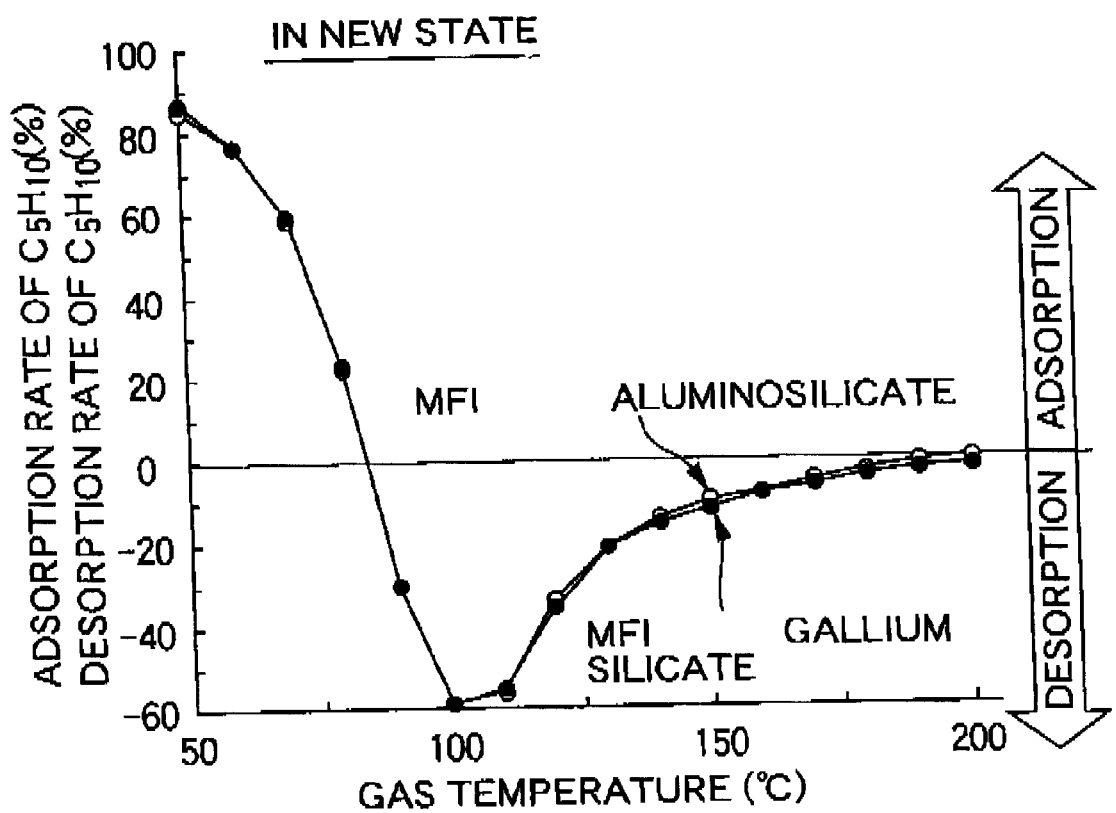
FIG. 3 is a graph showing the relationship between a gas temperature and an adsorption rate of $C_5H_{10}$ as well as a desorption rate of $C_5H_{10}$ in a new state.
Figure 4:
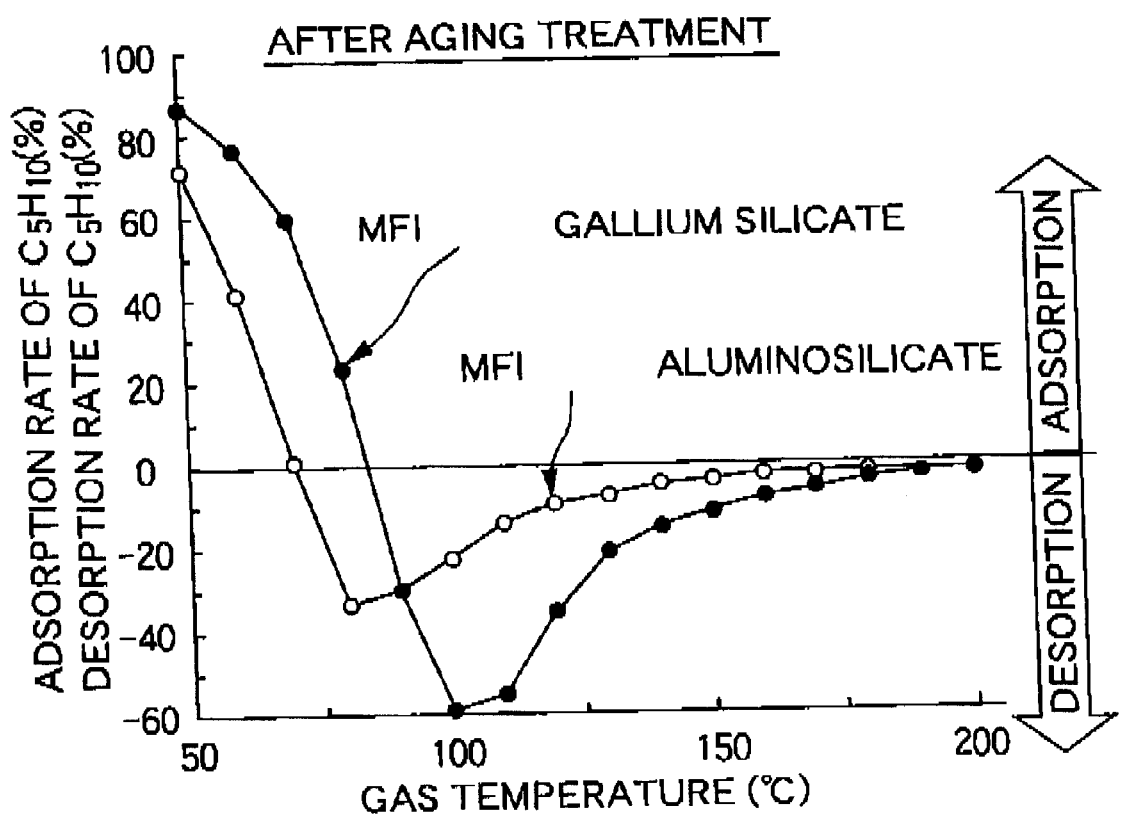
FIG. 4 is a graph showing the relationship between the gas temperature and the adsorption rate of $C_5H_{10}$ as well as the desorption rate of $C_5H_{10}$ after being subjected to an aging treatment.

FIGS. 3 and 4 show results of the measurement, FIG. 3 corresponding to the MFI gallium silicate in the new state, and FIG. 4 corresponding to the MFI gallium silicate after being subjected to the aging treatment. As apparent from FIGS. 3 and 4, the adsorption and desorption rates of $C_5H_{10}$ by the MFI gallium silicate after being subjected to the aging treatment are substantially the same as those provided by the MFI gallium silicate in the new state. Therefore, it can be seen that the MFI gallium silicate has an excellent heat-resistance. On the other hand, the $C_5H_{10}$ adsorbing and desorbing ability of the MFI aluminosilicate after being subjected to the aging treatment is lower than that of the MFI aluminosilicate in the new state. This is attributable to a low heat-resistance of the MFI aluminosilicate.

The MFI metallo-silicate may contain both of gallium and indium as skeleton forming elements.

What is claimed is:

1. An exhaust system comprising a heat-resistant HC adsorbent comprising an MFI metallo-silicate containing at least one of gallium (Ga) and indium (In) as a skeleton forming element, and having a metal component ME comprising at least one of an alkali metal and an alkaline earth metal in a content of ME≦0.05% by weight,
wherein said heat-resistant HC adsorbent is heat resistant in a hydrothermal atmosphere and is heat resistant at a temperature of 1000° C.,
and wherein the heat-resistant HC adsorbent is disposed in the exhaust system.

2. The exhaust system comprising a heat-resistant HC adsorbent according to claim 1, wherein said MFI metallo-silicate includes 0.04% by weight Al.

3. The exhaust system comprising a heat-resistant HC adsorbent according to claim 1, wherein said MFI metallo-silicate includes gallium (Ga).

4. The exhaust system comprising a heat-resistant HC adsorbent according to claim 3, wherein the gallium (Ga) content is in a range of 0.01% by weight to 0.5% by weight.

5. The exhaust system comprising a heat-resistant HC adsorbent according to claim 1, wherein said MFI metallo-silicate includes indium (In).

6. The exhaust system comprising a heat-resistant HC adsorbent according to claim 5, wherein the indium (In) content is in a range of 0.01% by weight to 0.6% by weight.

7. The exhaust system comprising a heat-resistant HC adsorbent according to claim 1, wherein the exhaust gas system is in an automobile.

8. The exhaust system comprising a heat-resistant HC adsorbent according to claim 7, wherein the heat-resistant HC adsorbent is downstream in the exhaust gas system from an exhaust emission control catalyst.

* * * * *